A. E. RHOADES.
SHAFT BEARING CONSTRUCTION FOR WARPERS.
APPLICATION FILED MAY 29, 1919.

1,328,451.   Patented Jan. 20, 1920.

Inventor.
Alonzo E. Rhoades
by Heard Smith & Tennant
Attys.

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

SHAFT-BEARING CONSTRUCTION FOR WARPERS.

1,328,451.  Specification of Letters Patent.  Patented Jan. 20, 1920.

Application filed May 29, 1919. Serial No. 300,562.

*To all whom it may concern:*

Be it known that I, ALONZO E. RHOADES, a citizen of the United States, residing at Hopedale, county of Worcester, State of Massachusetts, and whose post-office address is Hopedale, Massachusetts, have invented an Improvement in Shaft-Bearing Construction for Warpers, of which the following description, in connection with the accompanying drawing, is a specification, like characters on the drawing representing like parts.

This invention relates to a shaft bearing construction particularly designed for the shaft of a warp beam of a warper, but useful for any other purpose where similar conditions exist.

In an ordinary warper the warp beam has the ends of its shaft or trunnions supported in bearings in a pair of swinging arms pivotally mounted on the frame. This warp beam is a very heavy structure, and it has to be placed in position in the bearing arms at the beginning of the warping operation and removed therefrom at the conclusion of the operation. Owing to the frequent removal and replacement of the warp beam in the bearings, and the constant rotation of the shaft in the bearings, a very considerable amount of wear takes place. It is therefore necessary to renew the bearings. When, as is usual, these bearings are an integral part of the supporting arms it is consequently necessary to renew the entire supporting arms.

The object of the present invention is to provide a shaft bearing construction in which the friction is directly taken by a removable bearing sleeve mounted in the bearing member and in which provision is made for securing the shaft in position in the bearing by rotating the bearing sleeve in the bearing member.

These and other objects of the invention will appear more fully from the accompanying description and drawings, and will be particularly pointed out in the claims.

The drawings disclose the invention in its preferred form as applied to a familiar type of warper.

In the drawings—

Figure 1:
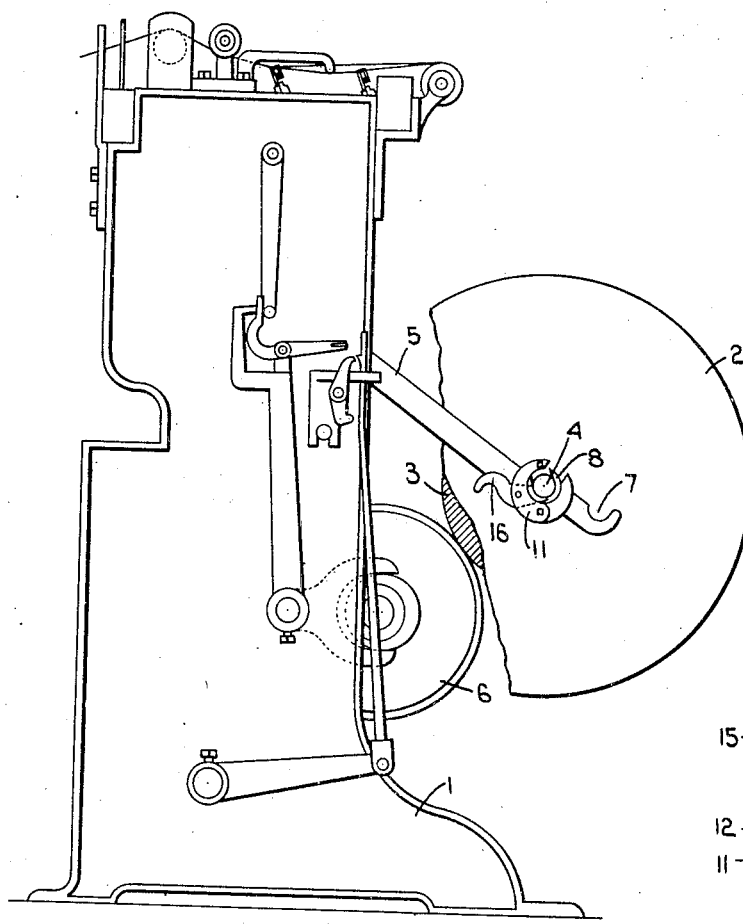
Figure 1 is a view in side elevation of so much of a warper as is sufficient for a disclosure of the invention with a preferred form of the invention applied thereto.
Figure 2:
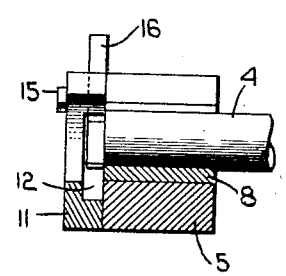
Fig. 2 is a detail in vertical cross section taken on the line 2—2 of Fig. 4 showing the bearing construction.

While the invention is applicable to various uses, it is particularly designed for use in connection with a well known type of warper such as shown in the drawings the details of which form no part of the present invention.

In this type of warper the side frames 1, one only of which is shown, support the various shafts and the mechanism of the warper. The warp beam 2 is a spool like structure having a central barrel 3, end disks, and a shaft 4 projecting at each end to form trunnions. This warp beam has its shaft or trunnions resting in bearing members such as the bearing arms 5, one only of which is shown, and these arms are pivotally mounted to the warper frame or a shaft passing therethrough. The warp beam is rotated by the peripheral contact of a drum 6 with the body of warp wound on the barrel 3. Consequently as the mass of the warp increases the warp beam rises and the bearing arms 5 swing upwardly about their pivots. When the warp beam is filled, it is bodily removed from the bearing members and an empty warp beam placed in the bearings. The ends of the bearing arms 5 are provided with recesses 7 from which the usual weights may be hung to hold the warp mass on the beam against the drum 6.

It will thus be seen that owing to the frequent removal and replacement of the warp beams in the bearings, and the constant rotation of the trunnions of the warp beams in the bearings that a large amount of wear takes place, and the bearings are also subject to injury and damage from the dropping into place of the heavy warp beam. If the bearing be formed bodily or integrally in the bearing member or arm 5, then this entire member has to be replaced when the bearing is worn or injured.

Figure 4:
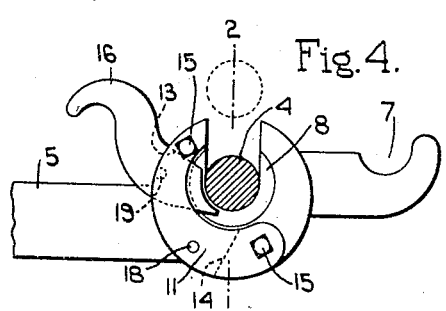
Fig. 4 is a view similar to Fig. 3 with the bearing shown in open position.

In the present invention the bearing member or arm 5 is provided on its upper surface with a cylindrical seat and in this cylindrical seat is mounted a cylindrical bearing sleeve 8. This bearing sleeve is of such a size that at its interior surface it fits snugly the exterior of the shaft or trunnion 4, and at its exterior surface it fits snugly the cylindrical seat in the bearing member. Both the cylindrical seat in the bearing member, and the cylindrical bearing sleeve are provided with lateral openings 9 and 10 respectively, each of a width as great as the shaft diameter, so that when these openings are in radial alinement as shown in Fig. 4, the shaft 4 may be passed therethrough into bearing position in the sleeve. In Fig. 4 the dotted circle indicates the shaft about to be dropped into position and in full lines the shaft is shown seated in position in the bearing.

Figure 3:
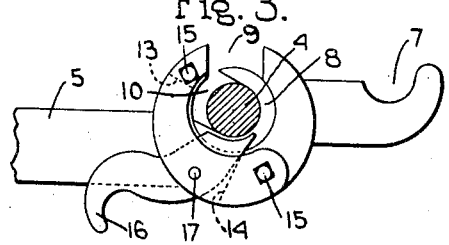
Fig. 3 is a side elevation of the end of the bearing arm with the shaft shown on cross section, and with the bearing shown in closed or locked position.

The shaft is retained in position and prevented from jumping or being thrown out of the bearing by rotarily adjusting the sleeve in its seat with respect to the bearing member to bring the opening 10 out of radial alinement with the opening 9, and the sleeve is shown thus rotarily adjusted in Fig. 3 from which it may be seen that the shaft is prevented from removal from the bearing.

Preferably means are provided for rotating the sleeve in its seat, and for locking it in adjusted position. As a simple and efficient construction for securing this result the end or face of the bearing member is shown provided with a sector shaped plate 11, and having a recess 12 at its inner face separating the body of the plate from the end of the bearing member. The end walls 13 and 14 of this recess may act as stops. This sector shaped plate may be, as shown, secured in place by screws 15 extending therethrough and into the end of the bearing member. An arm 16 is formed integrally with or secured to the outer end of the bearing sleeve, and is so arranged as to project through the recess 12, and form a handle by which the bearing sleeve may be rotated, the limits of rotation being set by the stop faces 13 and 14. This arm and consequently the bearing sleeve may be locked in any desired position, as in the position in which the bearing is closed to prevent removal of the shaft, by means of a pin 17 passed through alined openings 18 in the plate 11 and 19 in the arm.

The operation of the device is apparent. When it is desired to place the warp beam in the bearings the arm 16 is swung upwardly until the openings 9 and 10 of the bearing member and bearing sleeve come into alinement as shown in Fig. 4. The warp beam with its bearings or trunnions 4 is then dropped into place. The arm 16 is then swung downwardly to bring the openings 9 and 10 out of alinement and into position such as shown in Fig. 3. The pin 17 is inserted in the alined openings 18 and 19, and the bearing sleeve is thus locked in rotarily adjusted or closed position as shown in Fig. 3. Whenever the bearing becomes worn or injured all that it is necessary to do is to remove the screws 15 with the sector plate 11, and replace the bearing sleeve and arm by a new one, and screw the sector plate back into position.

Having thus described my invention what I claim as new and desire to secure by Letters Patent is—

1. A shaft bearing construction comprising a bearing member having a cylindrical seat, a bearing sleeve fitting said seat and the shaft, both said member and said sleeve having lateral openings of a width as great as the shaft diameter whereby when the said openings are in radial alinement the shaft may be passed therethrough into bearing position in the sleeve, an arm connected to and extended radially from the sleeve, a plate detachably secured to the end face of the bearing member having a sector shaped recess to receive said arm and to permit same to be rotarily adjusted therein with respect to the bearing member to bring the openings in said member and said sleeve in alinement and thus prevent the removal of the shaft, the detachability of said plate being adapted to permit the removal and replacement of the sleeve.

2. A shaft bearing construction as defined in claim 1 in which the plate is provided with an opening, and the arm with an opening which are in alinement when the arm is in rotarily adjusted closed position and through which alined openings a pin may be inserted to lock the parts in position.

In testimony whereof, I have signed my name to this specification.

ALONZO E. RHOADES.